United States Patent [19]

Yamada

[11] Patent Number: 5,157,507
[45] Date of Patent: Oct. 20, 1992

[54] IMAGE FORMING APPARATUS THAT DISCRIMINATES AN IMAGE PORTION AND A CHARACTER PORTION

[75] Inventor: Takanobu Yamada, Toyokawa, Japan

[73] Assignee: Minolta Camera Kabushiki Kaisha, Osaka, Japan

[21] Appl. No.: 707,787

[22] Filed: May 30, 1991

[30] Foreign Application Priority Data

May 31, 1990 [JP] Japan .................................. 2-143367

[51] Int. Cl.⁵ ........................ H04N 1/21; G03G 15/01
[52] U.S. Cl. .................................... 358/300; 358/462; 358/75; 346/157; 355/326
[58] Field of Search .................. 358/75, 300, 462; 346/157; 355/326, 327

[56] References Cited

U.S. PATENT DOCUMENTS

| | | | |
|---|---|---|---|
| 4,903,143 | 2/1990 | Sakamoto | 358/462 X |
| 4,931,875 | 6/1990 | Tadauchi | 358/300 |
| 4,974,028 | 11/1990 | Enoguchi et al. | 355/259 |
| 4,990,968 | 2/1991 | Kusuda | 355/326 |
| 4,996,603 | 2/1991 | Kanemitsu et al. | 358/462 |
| 5,023,662 | 6/1991 | Kusumoto et al. | 355/326 X |
| 5,030,996 | 7/1991 | Tajima et al. | 355/326 X |
| 5,038,176 | 8/1991 | Yokoyama et al. | 355/326 X |

FOREIGN PATENT DOCUMENTS 61-13262 6/1986 Japan .
63-166550 7/1988 Japan .

Primary Examiner—Benjamin R. Fuller
Assistant Examiner—Eric Frahm
Attorney, Agent, or Firm—Burns, Doane, Swecker & Mathis

[57] ABSTRACT

An image forming apparatus having a plurality of developing units containing developer the colors of which are different from each other for forming a full-color image. In this image forming apparatus, a character portion of an original is distinguished from a picture portion thereof upon the scan of the original, and the image formation for the character portion is performed in a different developing condition from the developing condition in which the image formation for the picture portion is performed.

10 Claims, 9 Drawing Sheets electric field
intensity electric field
intensity

IMAGE FORMING APPARATUS THAT DISCRIMINATES AN IMAGE PORTION AND A CHARACTER PORTION

BACKGROUND OF THE INVENTION

1. Field of the Invention

The present invention relates to an image forming apparatus, and more specifically relates to a full-color image forming apparatus.

2. Description of the Related Arts

Digital full-color image forming apparatus which form full-color images based on digital image data using cyan, magenta and yellow color toners have been known for some time.

Full-color image forming apparatus also have been proposed wherein the picture portion and the character portion of the original document are discriminated. The picture portion of the original document is subjected to image formation by multicolor overlays of color toners, while the character portion is subjected to image formation by a single color toner such as black toner or the like so as to avoid a reduction in image quality in the character portion thereof and maintain the fidelity of the reproduction of the color display of the image portion thereof.

Color image forming apparatus are also known which employ an under color removal (UCR) process wherein the black regions and shadow regions of the image portion are removed from the three-color toner developing and developed with black toner in a substitution process so as to enhance image registration and improve line reproducibility as well as reduce the consumption of color toner.

However, when the picture portion is developed by multicolor overlays of color toners and the character portion is developed by a black toner, there is a disadvantage in that the character portion is developed under developing conditions that optimize the color reproducibility in the image portion, thereby detracting from the reproducibility of the character portion. Conversely, when developing conditions are set to optimize the reproducibility of the character portion, the color reproducibility of halftones in the picture portion is reduced.

These disadvantages also occur in the image forming apparatus using the previously mentioned UCR process.

SUMMARY OF THE INVENTION

A main object of the present invention is to provide an image forming apparatus having excellent document reproducibility.

A further object of the present invention is to provide a full-color image forming apparatus having excellent document color reproducibility.

A still further object of the present invention is to provide a full-color image forming apparatus having excellent color reproducibility for both the picture portion and the character portion of an original document.

These objects of the present invention are accomplished by providing an image forming apparatus comprising:

a reading means for reading an original document image;

a discrimination means for discriminating the characters within the image data read by the reading means;

an image forming means for forming a latent image on the surface of a photosensitive member in accordance with the image data;

a first developing device accommodating a color toner to develop the latent image formed on the surface of the photosensitive member;

a second developing device accommodating a black toner for developing the latent image formed on the surface of the photosensitive member;

a first control means for controlling the first and second developing devices so as to develop under a first set of developing conditions the latent image corresponding to image data relating to that portion of the image that remains after eliminating the characters discriminated by the discrimination means; and a second control means for controlling the second developing device so as to develop under a second set of developing conditions the latent image corresponding to the characters within the image data discriminated by the discrimination means.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIGS. 1 through 8 show a first embodiment of the present invention.

FIG. 1 shows a section view of the general construction of a digital full-color copying machine;

FIG. 2 is a block diagram of the image signal processing;

FIG. 3 is a brief illustration of the image forming operation;

FIG. 6 is an illustration showing suitable gamma characteristics for image forming of the image portion and the character portion.

FIG. 7 is a brief section view showing the arrangement of the photosensitive drum and the developing device;

FIG. 8 is an illustration showing the relationship between the developing potential and developing density when the circumferential speed ratio of the photosensitive drum and the developing sleeve is changed;

FIG. 9 is a brief section view showing the arrangement of the photosensitive drum and the developing device;

FIG. 10a is an illustration showing the distribution of the electrical field intensity when the photosensitive drum and the developing sleeve are positioned so as to have a large space therebetween;

FIG. 10b is an illustration showing the distribution of the electrical field intensity when the photosensitive drum and the developing sleeve are positioned so as to have a small space therebetween;

FIG. 11 is an illustration showing the position of the main magnetic poles of the magnetic roller;

FIG. 12 is an illustration showing the relationship between the positions of the main magnetic poles of the magnetic roller and the image density and edge effect;

DETAILED DESCRIPTION OF THE PREFERRED EMBODIMENTS

The first embodiment of the present invention is described hereinafter with reference to FIGS. 1 through 8.

Figure 1:
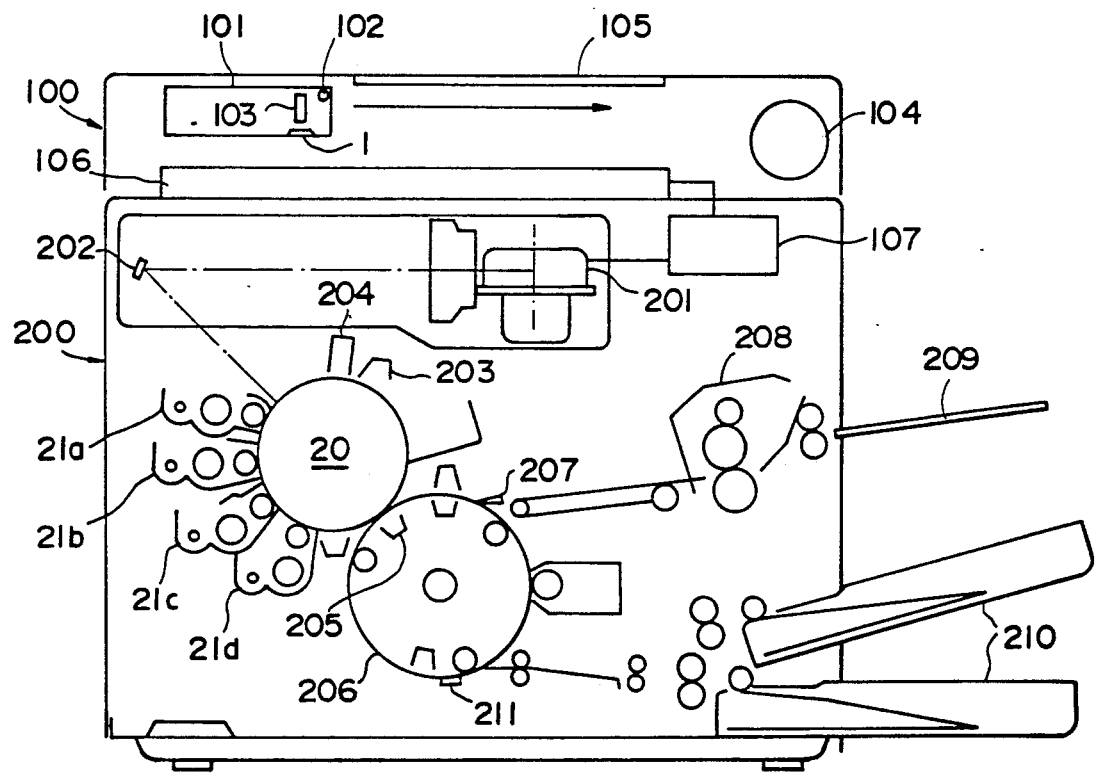

The general construction of a digital full-color copying machine is described hereinafter with reference to FIG. 1. The digital full-color copying machine can be broadly divided into the image reader portion 100 for reading the document image and the printer portion 200 for reproducing the image read by the image reader portion.

In the image reader portion 100, is a scanner 101 comprising an exposure lamp 102 for exposing the original document, a rod lens array 103 for condensing the light reflected from the original document, and a contact type charge-coupled device (CCD) color image sensor 1 for switching the condensed light into electrical signals. The scanner 101 is actuated by a motor 104 during the document reading operation so as to scan a document disposed on the platen 105. The image on the surface of the original document is photoelectrically converted by the image sensor 1. The multilevel electrical signals for the three colors R, C, B obtained by the aforesaid conversion are then converted by the image signal processing unit 106 into the 8-bit halftone data for yellow (Y), magenta (M), cyan (C), or black (Bk), and simultaneously stored in the buffer memory 107.

In the printer portion 200, the print head 201 generates the laser diode actuation signals via analog-to-digital (A/D) conversion of the image data, so as to emit a semiconductor laser beam modulated by these signals. The laser beam emitted from the print head 201 exposes the surface of the rotating photosensitive drum 20 via a reflective mirror 202. The photosensitive drum 20 is irradiated by an eraser lamp 203 prior to each single exposure, and is then electrically charged by a charger 204. In the aforesaid charged state the surface of the photosensitive drum 20 is exposed by the laser beam so as to form an electrostatic latent image on the surface thereof in accordance with the original document image. Any single developing device from among the yellow, magenta, cyan and black color toner accommodating developing devices 21a through 21d may be selected to develop the electrostatic latent image formed on the surface of the photosensitive drum 20. The developed toner image is then transferred by the transfer charger 205 to a copy sheet wound on the transfer drum 206.

The aforesaid printing process is repeated for each of the four colors yellow, magenta, cyan and black. At this time, the scanning operation of the scanner 101 is repeated synchronously with the operation of the photosensitive drum 20 and the transfer drum 206. Thereafter, the copy sheet is separated from the transfer drum 206 by the operation of the separation hook 207, and passes through the fixing unit 208 where the toner image is fixed thereon, then discharged to the discharge tray 209. The leading edge of the copy sheet supplied from the paper cassette 210 is checked by a checking mechanism 211 on the surface of the transfer drum 206 so as to prevent positional dislocation while transferring.

Figure 2:
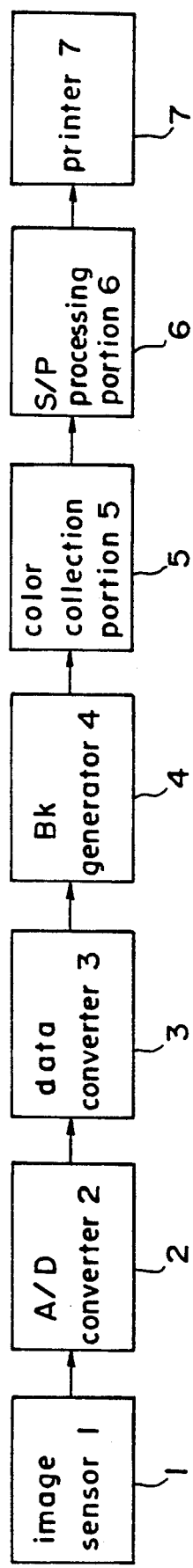
Figure 3:
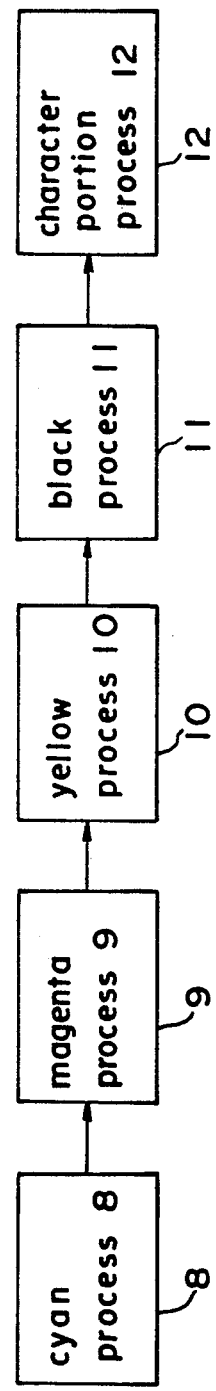

In the image signal processing of the previously described full-color copying machine, the R (red), G (green) and B (blue) analog image signals are suitably amplified, and converted into 8-bit (256 gradations) digital signals by the A/D converter 2, as shown in FIG. 2. Then, the RGB digital signals comprising the reflected light data are converted to Y (yellow), M (magenta) and C (cyan) density data by the data converter 3. Next, the BK generator 4 executes the UCR process on the YM data and generates Bk (black color) data for the inking process. A color correction process is executed by the color correction portion 5 to accomplish faithful color reproduction of the original document by the spectral characteristics of the toner colors. Finally, the edge intensity and smoothing processes are executed by the sharpness/filter processing portion 6 in accordance with the sharpness mode. The thus obtained image signals are then transmitted to the printer 7 to accomplish image formation.

In the printer portion 200, the picture portion of the original document comprising a photograph or the like is reproduced by executing the cyan image forming process 8 for forming an image with cyan toner, the magenta image forming process 9 for forming an image with magenta toner, and the yellow image forming process 10 for forming an image with yellow toner so as to form a full color image. Thereafter, the black image forming process 11 for inking with black toner is executed to ink the picture portion of the document reproduction, and, subsequently, the black image forming process 12 for reproducing the character portion of the original document is executed to complete the image formation.

An actual image forming operation is described hereinafter with reference to the flow chart shown in FIGS. 4(a),(b).

Figure 4A:
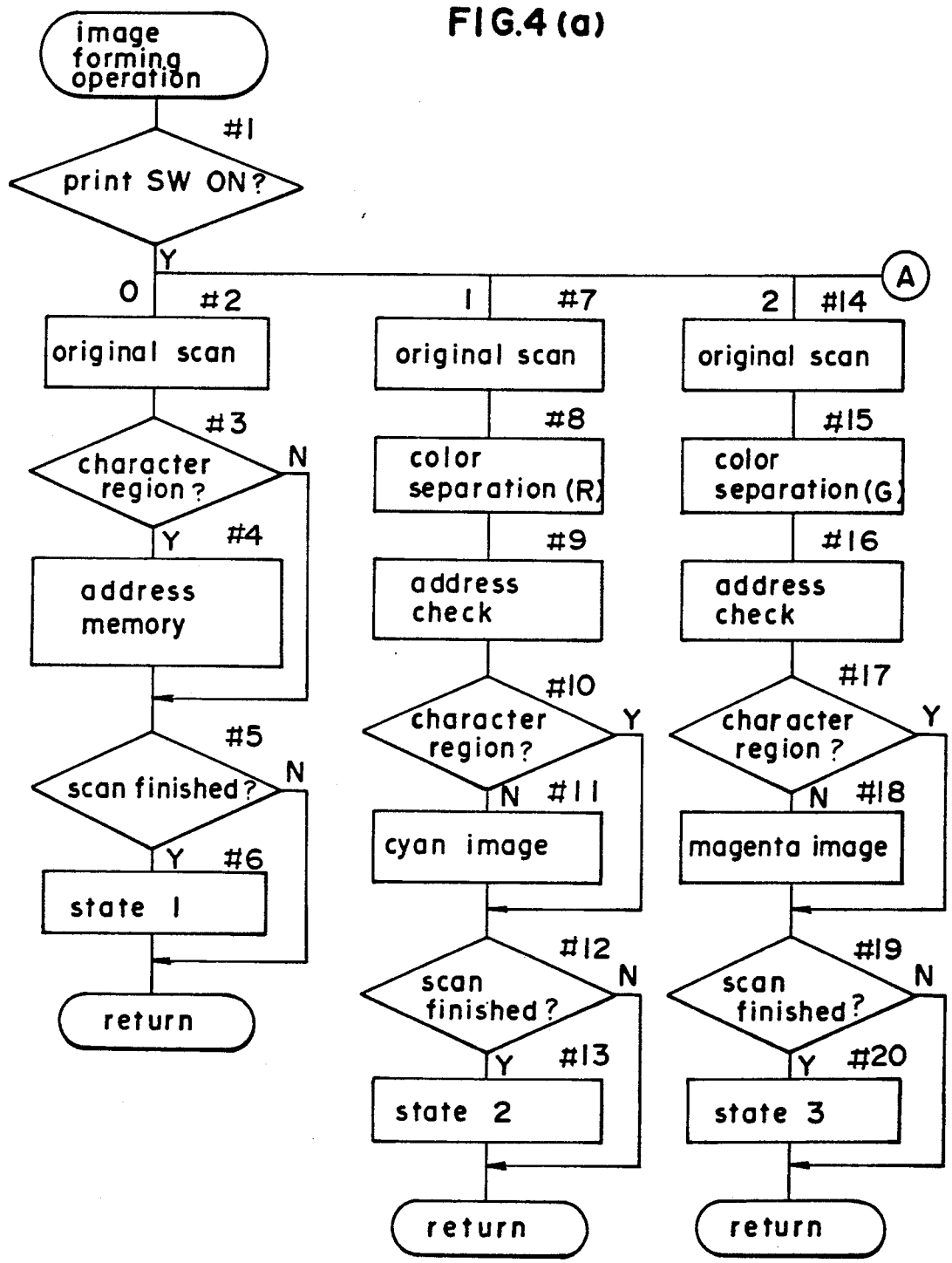
FIGS. 4(a),(b) are flow charts showing the image forming operation controls.
Figure 4:
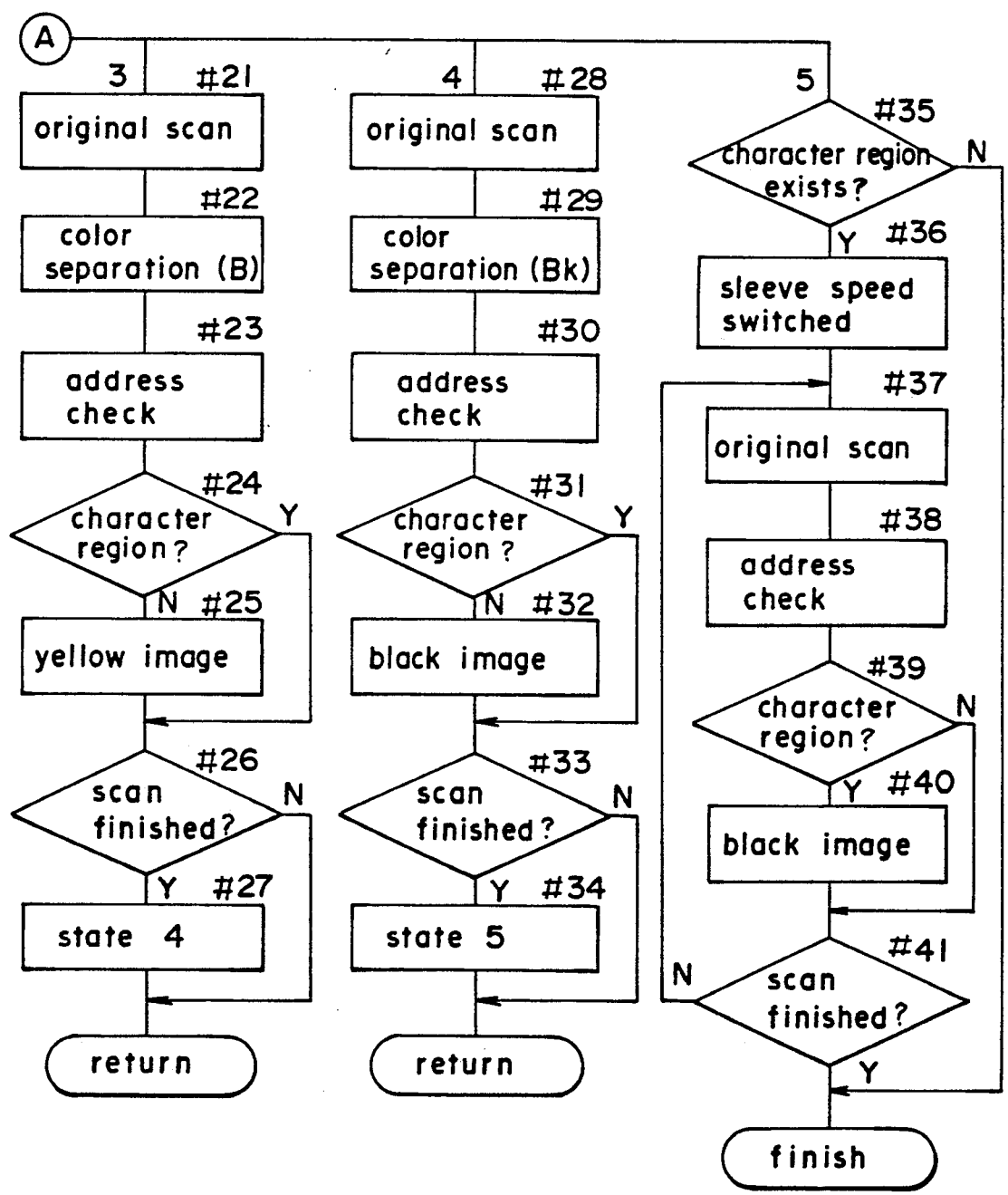

When the print switch is switched ON (step 1), the apparatus migrates to state 0, and the character region of the original document is discriminated as shown in FIG. 4(a).

Figure 5A:
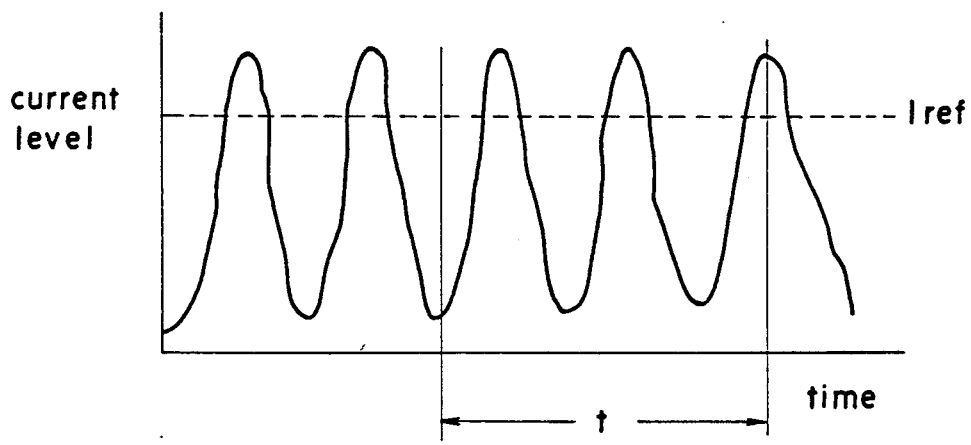
FIG. 5a illustrates the image signal waveform for the character portion of the original document.
Figure 5B:
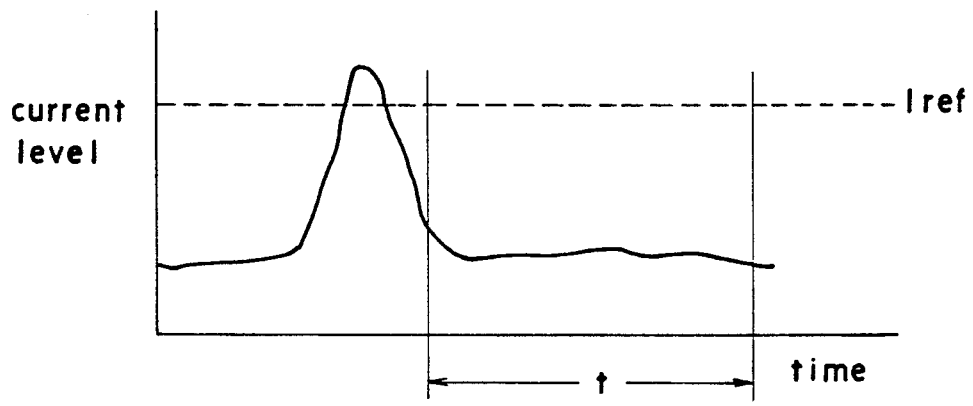
FIG. 5b illustrates the image signal waveform for the picture portion of the original document.

The discrimination of the character region can be accomplished by detecting the periodicity of the changes in current levels of the detection signals output from the image sensor. In FIGS. 5a and 5b, the region of the current level that is greater than the reference value $I_{ref}$ correlates to the background portion, whereas the region of the current level that is less than $I_{ref}$ correlates to the picture portion or the character portion of the original document. As shown in FIG. 5a, the character portion is discriminated if the points at which the signal waveform intersect the reference value $I_{ref}$ occur a specified number of times or more within a specific time period (t), and as shown in FIG. 5b, the picture portion is discriminated if the points at which the signal waveforms intersect the reference value $I_{ref}$ do not occur a specified number of times within a specific time period (t).

In the 0 state, the original document is first scanned (step 2), the existence of characters is discriminated by the previously described method (step 3), and the starting address and the ending address of the character region is stored in the memory of the recording portion simultaneously with the aforesaid discrimination (step 4). The aforesaid operation is executed until the scanning is completed (step 5), and when the scan is completed the apparatus state is updated to 1 (step 6).

When the apparatus migrates to state 1, the picture portion image formation by cyan toner is executed. The document is scanned (step 7), the detection signals from the image sensor are color separated, and the R (red) detection signals are fetched (step 8). Next, a check is made of the addresses in the recording portion (step 9), the existence of a character region is discriminated (step 10), and that portion of the picture that is not in the character region is subjected to image formation by cyan toner (step 11). The aforesaid operation continues until the scanning is completed (step 12), and when the scan is completed the apparatus state is updated to 2 (step 13).

In state 2, just as in state 1, the image forming operation for the picture portion is executed using magenta toner based on the G (green) detection signals, and the apparatus states is updated to 3 (steps 14 through 20).

In state 3, just as in states 1 and 2, the image forming operation for the picture portion is executed using yellow toner based on the B (blue) detection signals, and the apparatus state is updated to 4 (steps 21 through 27) as shown in FIG. 4(b).

In state 4, picture portion inking is executed using black toner. First, the document is scanned (step 28), and the detection signals of the black color parts including each RGB color elements are fetched from among the detection signals output by the image sensor (step 29). Then, the addresses in the recording portion are checked (step 30), and the existence of a character portion is discriminated (step 31). Next, image formation is executed for the non-character region, i.e., the black color region of the image portion with black toner (inking) based on the aforesaid discrimination results (step 32). The aforesaid operation continues until the scanning is completed (step 33); when the scan is completed, the apparatus state is updated to 5 (step 34).

Figure 6:
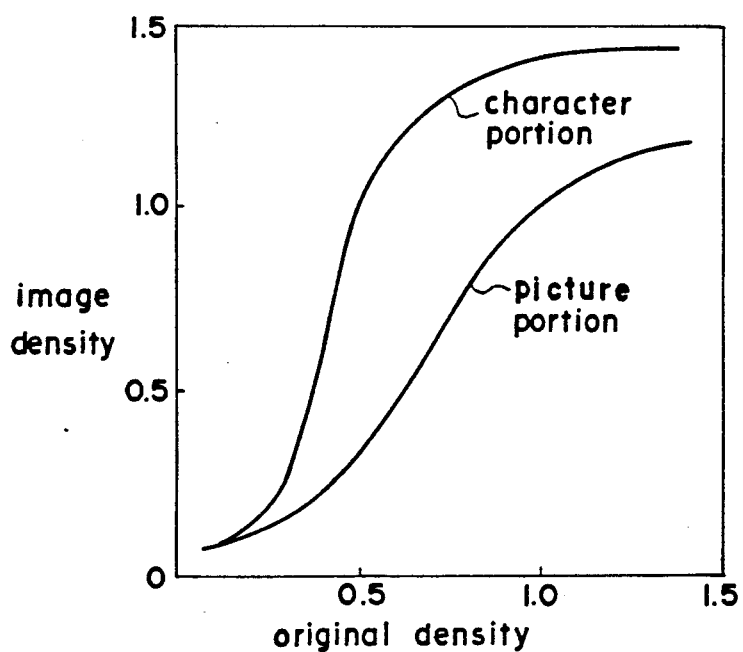

In state 5, image formation is executed for the character portion using black toner. In the image forming process of the previously described states 1 through 4, a high-fidelity color reproduction image is produced when the image forming conditions are set such that the slope (referred to as the "gamma value") of the halftone characteristics of the document density and image density is near 1, as shown in FIG. 6. A sharp, high quality image cannot be obtained when the image formation of the character portion is executed under the aforesaid conditions because the density gradations for fidelity and resolution are in conflict. Therefore, in the image forming process for the character portion, the image forming conditions are set such that the gamma value is sufficiently greater than 1. Although there are various means for changing the gamma value, the means used in the present embodiment is to switch the rotational speed of the developing sleeve, said means being described in detail later.

In state 5, the recording portion is first checked to determine whether or not a character region exists (step 35), and if a character region does not exist the image forming operation is completed. If a character region does exist, the rotational speed of the developing sleeve is switched to achieve suitable image forming conditions for reproducing characters (step 36). Next, the document is scanned (step 37), and the addresses in the recording portion are checked (step 38) to discriminate whether or not a character region exists (step 39). If the aforesaid discrimination determines a character region exists, image formation is executed for the character region portion of the image with black toner (step 40). The aforesaid operation continues until the scanning is completed (step 41), and when the scan is completed the image forming operation is completed.

Figure 7:
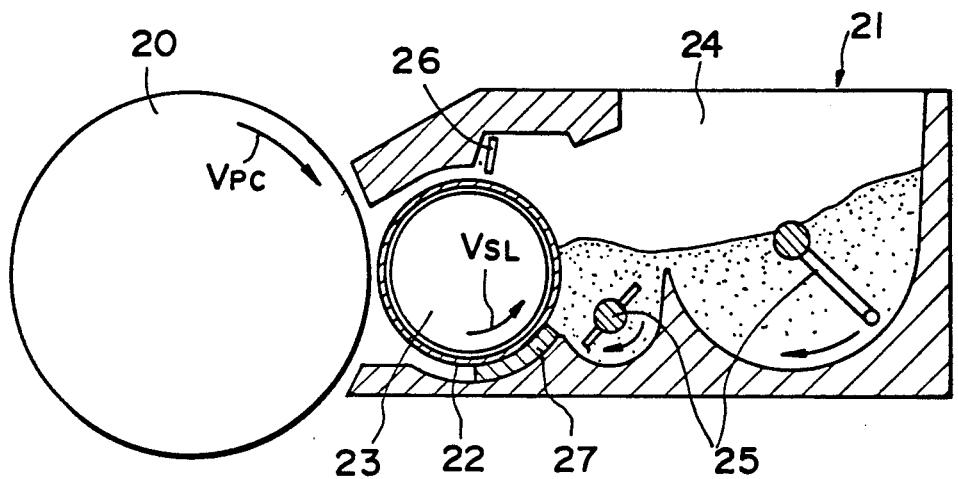
Figure 8:
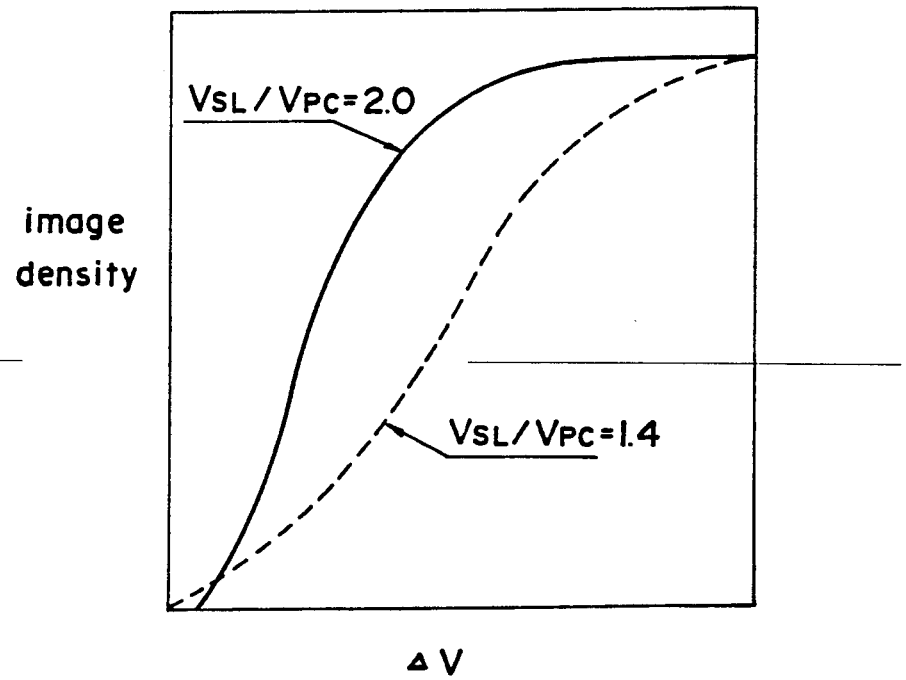

The means for changing the image forming condition gamma value by switching the rotational speed of the developing sleeve is described hereinafter with reference to FIGS. 7 and 8. In FIG. 7, the photosensitive drum 20 has a developing device 21 (21a through 21d) provided in the developing portion. The developing device 21 is provided a rotatably driven developing sleeve 22 opposite the photosensitive drum 20 so as to have a fine gap provided therebetween; the developing sleeve 22 contains a internal magnetic roller 23 therein. The developing device 21 is also provided a mixing mean 25 for mixing and triboelectrically charging the toner accommodated within a toner tank 24 and supplying said toner onto the surface of the developing sleeve 22, a brush-height regulating means 26 for regulating the height of the magnetic brush formed on the surface of the developing sleeve 22, and a seal means 27 for preventing toner leakage. The photosensitive drum 20 and the developing sleeve 22 are linked by means of a speed converter (not shown in the drawings) that switches the peripheral speed $V_{SL}$ of the developing sleeve 22 relative to the peripheral speed $V_{PC}$ of the photosensitive drum 20.

During image formation of the image portion, the respective peripheral speed are set such that the ratio of the peripheral speeds $V_{SL}/V_{PC}$ for the developing sleeve 22 relative to the photosensitive drum 20 is 1.4. The image density characteristics relative to the developing potential $\Delta V$ approach a proportional relationship, as indicated by the broken line in FIG. 8, such that the intermediate halftones of the picture portion can be faithfully reproduced in the formed image. During the image formation of the character portion, on the other hand, the respective speeds of the drum and sleeve are set such that the ratio of the peripheral speeds $V_{SL}/V_{PC}$ is 2.0. The aforesaid speeds ratio setting allows developing with a high gamma value, as indicated by the solid line in FIG. 8, thereby increasing the edge effect. and producing a sharp images.

Figure 9:
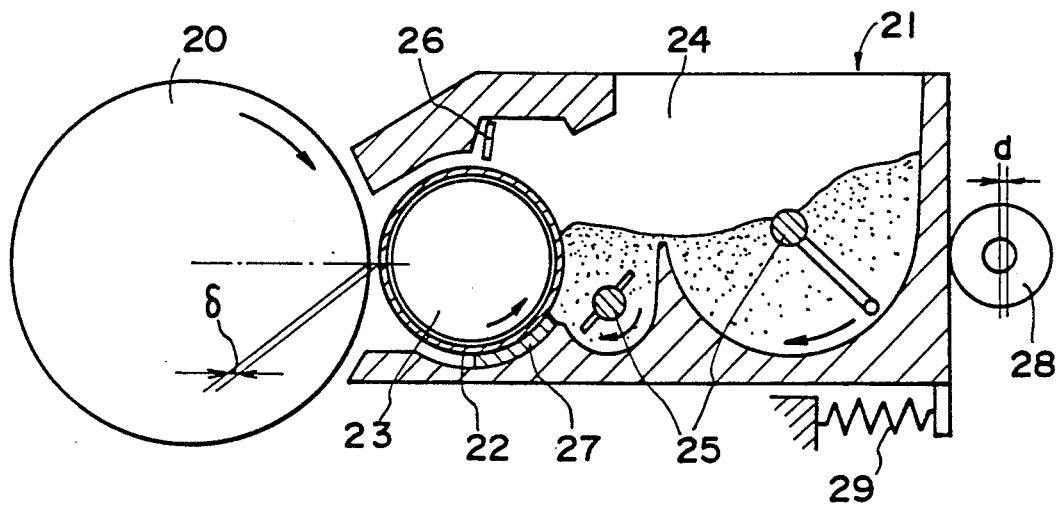
FIGS. 9 and 10 show a second embodiment of the invention.
Figure 10:
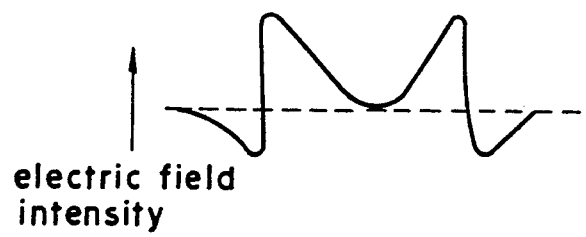
Figure 10:
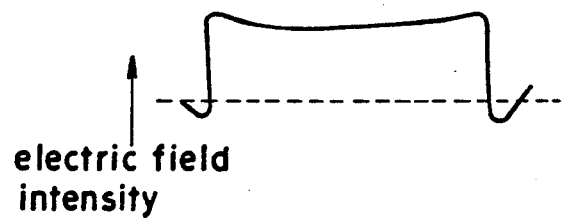

Although in the previously described embodiment the developing conditions were changed by switching the peripheral speed of the developing sleeve 22 during the image forming operations for the picture portion and the character portion, it is to be noted that the gap δ between the photosensitive drum 20 and the developing sleeve 22 may also be changed as shown in the second embodiment of the invention shown in FIGS. 9 and 10. That is, a second embodiment of the invention provides that the developing device 21 is supported so as to be movably disposed closer to, or farther from the photosensitive drum 20, and the developing device 21 receives a force imparted by a spring 29 opposite a cam 28, the center of which is just slightly offset eccentrically a distance d relative to the rotational center. The gap δ between the photosensitive drum 20 and the developing sleeve 22 can be changed by adjusting the rotational position of the cam 28.

In the second embodiment, the aforesaid gap δ is set so as to be larger during image formation of the character portion. Therefore, the electric field intensity is stronger on the margin edges of the latent image, while said field is weaker in the interior of the image, as shown in FIG. 10a, thereby increasing the edge effect so as to produce sharp characters in the edge regions. The gap δ is set so as to be smaller during image formation of the picture portion, however. Thus, the electric field intensity is rendered uniform through an electrode effect, as shown in FIG. 10b, thereby producing images with uniformly slight edge effect.

Figure 11:
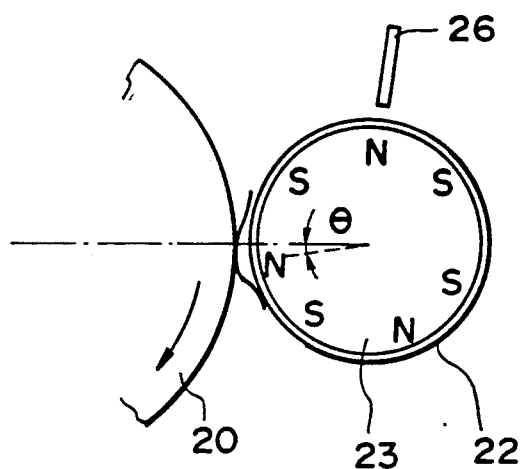
FIGS. 11 and 12 show a third embodiment of the invention.
Figure 12:
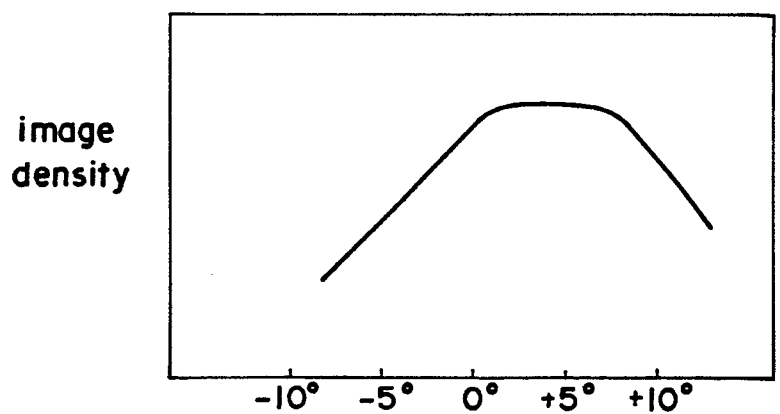

A third embodiment is shown in FIGS. 11 and 12 wherein the image density can be changed by changing the angle of the main magnetic pole among the magnetic poles of the magnetic roller 23 confronts the photosensitive drum 20 relative to a center line linking center of the photosensitive drum 20 and the center of the developing sleeve 22. Accordingly, sharp character reproduction can be achieved by setting the angle between the main magnetic pole and the center line at θ during image formation for the character portion so as to increase the image density compared to that during the image formation of the picture portion.

Figure 13:
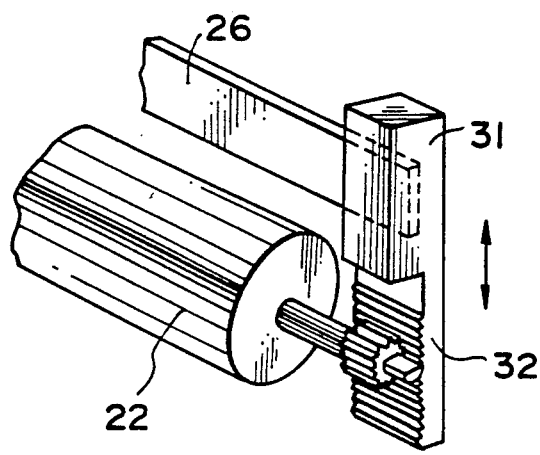
FIG. 13 is a perspective view of the position switching means of the brush height regulating means of the apparatus of the fourth embodiment of the invention.

A fourth embodiment of the invention is shown in FIG. 13 wherein a brush-height regulating means 26 is mounted to a movable member 32 that is driven in the perpendicular direction relative to the direction of rotation of the developing sleeve 22 by means of a rack and pinion mechanism 31; the gap between the brush-height regulating means 26 and the developing sleeve 22 may also be changed. During the image formation for the character portion, the brush height is set so as to be high, and the brush height is set so as to be low during image formation of the picture portion, thereby allowing fine adjustment of the image density.

Figure 14:
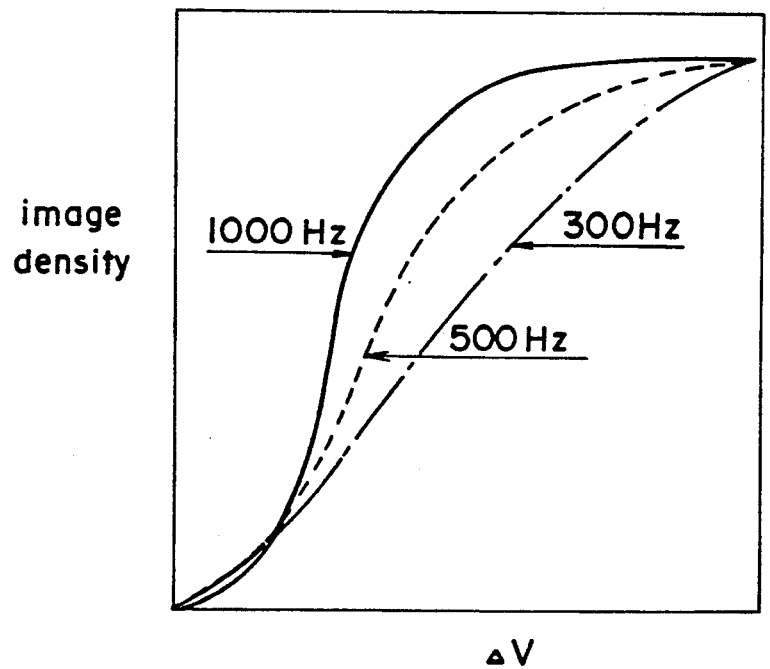
FIG. 14 is an illustration showing the relationship between image density and the developing potential when the frequency of the developing bias is changed in the apparatus of the fifth embodiment of the invention.

The gamma value can also be changed, as shown in FIG. 14, by changing the frequency of the AC (alternating current) bias superposed on a DC (direct current) bias supplied to the developing roller. That is, during image formation of the picture portion, the AC bias frequency is set at 300 Hz to cause the gamma value to approach 1, as indicated by the broken line in the drawing, while during image formation of the character portion the AC bias can be switched to 1,000 Hz to increase the gamma value, as indicated by the solid line, and thereby produce sharp characters in the character portion of the image.

Although the present invention has been described in terms of developing the black color character region under different developing conditions than the picture region, it should be noted that non-black character regions in colors such as cyan, magenta and yellow may be developed under developing conditions that differ from conditions used to develop the picture portion.

Further, while the present invention has been described as accomplishing discrimination of the character region by detecting changes in the current level of the detection signals output from an image sensor, it is to be notes that the character region may also be discriminated by detecting changes in the image spatial frequency.

Although the present invention has been fully described by way of examples with reference to the accompanying drawings, it is to be noted that various changes and modifications will be apparent to those skilled in the art. Therefore, unless otherwise such changes and modifications depart form the scope of the present invention, they should be construed as being included therein.

What is claimed is:

1. An image forming apparatus comprising:
   reading means for reading an image of an original;
   discriminating means for discriminating letters in the image read by said reading means and dividing said image into a letter portion and a remaining portion;
   image forming means for forming an electrostatic latent image on a surface of a photoreceptor according to the image;
   a plurality of developing units containing developer colors which are different from each other for developing said electrostatic latent image formed on the surface of the photoreceptor;
   first control means for energizing at least two of said developing units so as to develop in a first developing condition the electrostatic latent image corresponding to the remaining portion in the image; and
   second control means for energizing one of said developing units so as to develop in a second developing condition having a higher gamma correction value than said first developing condition the electrostatic latent image in the letter portion of the image.

2. An image forming apparatus as claimed in claim 1 wherein each of the developing units has a rotatable developing roller confronting the photoreceptor for transporting to the surface of the photoreceptor the developer contained in the developing unit while holding the developer on the surface thereof.

3. An image forming apparatus as claimed in claim 2 wherein the developing rollers rotate at a different speed in the second developing condition from that in the first developing condition.

4. An image forming apparatus as claimed in claim 2 wherein the developing rollers confront the photoreceptor through a different gap in the second developing condition from that in the first developing condition.

5. An image forming apparatus as claimed in claim 2 wherein a magnet roller having a plurality of magnetic poles is provided inside of each developing roller, the angle of one magnetic pole and line between the centers of the photoreceptor and the developing roller in the second developing condition is different from that in the first developing condition.

6. An image forming apparatus as claimed in claim 2 wherein each of the developing units is provided with a regulating member confronting the developing roller for regulating the height of the developer transported on the surface of the developing roller, said regulating member confronting the developing roller with a different gap in the second developing condition from that in the first developing condition.

7. An image forming apparatus as claimed in claim 2 wherein an AC bias voltage is superposed to a DC bias voltage applied to each developing roller for development, the frequency of the AC bias voltage is different in the second developing condition from that in the first developing condition.

8. An image forming apparatus comprising:
   reading means for reading an image of an original;
   discriminating means for discriminating letters in the image read by said reading means and dividing said image into a letter portion and a remaining portion;
   image forming means for forming a latent image on a surface of a photoreceptor according to the image;

a first developing unit containing a color toner for developing said latent image formed on the surface of the photoreceptor;

a second developing unit containing a black toner for the latent image formed on the surface of the photoreceptor;

first control means for controlling the first and second developing units so as to develop in a first developing condition the latent image corresponding to the remaining portion in the image; and second control means for controlling the second developing unit so as to develop in a second developing condition having a higher gamma correction value than said first developing condition the latent image corresponding to the letter portion of the image.

9. An image forming method comprising the steps of:

reading an image of an original;

discriminating letters in the image and dividing the image into a letter portion and a remaining portion;

forming a latent image on a surface of a photoreceptor based on said image;

first developing with a color toner in a predetermined developing condition the latent image corresponding to the remaining portion in the image;

second developing with a black toner in said predetermined developing condition the latent image corresponding to the remaining portion in the image; and third developing with the black toner in a developing condition different from the predetermined developing condition the latent image corresponding to the letter portion in the image.

10. A method as claimed in claim 9 wherein the image density in second developing is different from that in third developing.

* * * * *